United States Patent
Kim

(10) Patent No.: US 6,829,807 B2
(45) Date of Patent: Dec. 14, 2004

(54) DAMPER HINGE

(76) Inventor: Heung-Kee Kim, 114-102 Jangmimaeul Dongbu Apt., 331 Yatap-Dong, Bundang-Gu, sungnam-Si, Kyunggi-Do (KR), 463-788

( * ) Notice: Subject to any disclaimer, the term of this patent is extended or adjusted under 35 U.S.C. 154(b) by 0 days.

(21) Appl. No.: 10/331,909

(22) Filed: Dec. 30, 2002

(65) Prior Publication Data

US 2004/0060152 A1 Apr. 1, 2004

(30) Foreign Application Priority Data

Sep. 28, 2002 (KR) ................................ 10-2002-0059210

(51) Int. Cl.[7] .............................................. E05D 11/10
(52) U.S. Cl. ........................................ 16/322; 16/319
(58) Field of Search ........................ 16/272, 273, 277, 16/321, 322, 337, 338, 341–343; 379/433.11, 433.12, 433.13; 361/680–683, 801, 802

(56) References Cited

U.S. PATENT DOCUMENTS

| | | | | |
|---|---|---|---|---|
| 4,030,161 A | * | 6/1977 | Loikitz | 16/284 |
| 4,485,522 A | * | 12/1984 | Chen | 16/54 |
| 5,566,048 A | * | 10/1996 | Esterberg et al. | 361/681 |
| 5,636,275 A | * | 6/1997 | Takagi et al. | 379/433.13 |
| 5,799,371 A | * | 9/1998 | Lin | 16/330 |
| 5,906,010 A | * | 5/1999 | Suzuki | 4/236 |
| 5,923,751 A | * | 7/1999 | Ohtsuka et al. | 379/433.13 |
| 6,052,869 A | * | 4/2000 | Suzuki | 16/341 |
| 6,175,990 B1 | * | 1/2001 | Kato et al. | 16/334 |
| 6,459,887 B2 | * | 10/2002 | Okuda | 455/90.1 |
| 6,678,539 B1 | * | 1/2004 | Lu | 455/575.1 |
| 2003/0172494 A1 | * | 9/2003 | Oshima et al. | 16/285 |
| 2004/0074049 A1 | * | 4/2004 | Kawamoto | 16/256 |

FOREIGN PATENT DOCUMENTS

GB 02099497 A * 12/1992

* cited by examiner

*Primary Examiner*—Robert J. Sandy
*Assistant Examiner*—Andre' L. Jackson
(74) *Attorney, Agent, or Firm*—Cantor Colburn LLP

(57) ABSTRACT

Disclosed is a damper hinge for smoothly opening a cover from a main body in a small-sized portable article, thereby preventing a breakdown and damage of its hinge portion and assuring simplicity in its use. A spring supporting cap formed to have a hollow cylindrical shape opened at its one end opposite to an opened end of an external housing is disposed within the external housing, a sliding cam moving forward and backward by its rotation is provided within the spring supporting cap, a compression/torsion spring with one end fixed to the sliding cam and the other end fixed to the external housing is interposed between the spring supporting cap and the external housing, an internal housing is inserted into a gap between the other surface of the spring supporting cap and the inner surface of the external housing, the sliding cam is connected to the internal housing by an adjusting screw passing through the internal housing and spring supporting cap, and the internal housing is elastically supported by a compression spring installed between the spring supporting cap and the internal housing.

3 Claims, 3 Drawing Sheets

DAMPER HINGE

BACKGROUND OF THE INVENTION

1. Field of the Invention

The present invention relates to a damper hinge, and more particularly to a damper hinge for smoothly opening a cover from a main body in a small-sized portable article, thereby preventing a breakdown and damage of its hinge portion and assuring simplicity in its use.

2. Description of the Related Art

Generally, in case of women's cosmetics such as a compact powder, and portable articles such as a cellular phone, a notebook computer, and so on, a cover is simply hinged to its main body and a locking condition between the cover and the main body is maintained by locking means. Therefore, the cover must be manually opened from and closed into the main body.

However, this hinge configuration causes inconvenience and trouble to users, and in case the cover is pulled by force in order to be opened from the main body, a hinge portion of the cover may be easily broken or damaged, thereby losing its original function. Further, in case of women's cosmetics such as compact powders, powder particles easily escape from its hinge portion and thus it is messy and inconvenient to carry them.

SUMMARY OF THE INVENTION

Therefore, the present invention has been made in view of the above problems, and it is an object of the present invention to provide to a damper hinge for smoothly opening a cover from a main body in a small-sized portable article, thereby preventing a breakdown and damage of its hinge portion and assuring simplicity in its use.

In accordance with the present invention, the above and other objects can be accomplished by the provision of a damper hinge in which a spring supporting cap formed to have a hollow cylindrical shape opened at its one end opposite to an opened end of an external housing is disposed within the external housing, a sliding cam moving forward and backward by its rotation is provided within the spring supporting cap, a compression/torsion spring with one end fixed to the sliding cam and the other end fixed to the external housing is interposed between the spring supporting cap and the external housing, an internal housing is inserted into a gap between the other surface of the spring supporting cap and the inner surface of the external housing, the sliding cam is connected to the internal housing by an adjusting screw passing through the internal housing and spring supporting cap, and the internal housing is elastically supported by a compression spring installed between the spring supporting cap and the internal housing.

Preferably, a cam surface may be formed on one side surface of the sliding cam and a cam driving pin sliding along the cam surface may protrude from the inner surface of the spring supporting cap so that the sliding cam is rotated together with the rotation of the internal housing so as to move forward and backward.

Further, preferably, an enlarged section may be formed on the opened end of the spring supporting cap so as to limit a range of movement of the internal housing.

BRIEF DESCRIPTION OF THE DRAWINGS

The above and other objects, features and other advantages of the present invention will be more clearly understood from the following detailed description taken in conjunction with the accompanying drawings, in which:

FIG. 3a is a cross-sectional view of the damper hinge prior to its operation; and FIG. 3b is a cross-sectional view of the damper hinge during its operation.

DESCRIPTION OF THE PREFERRED EMBODIMENTS

Now, preferred embodiments of the present invention will be described in detail with reference to the annexed drawings.

Figure 1:
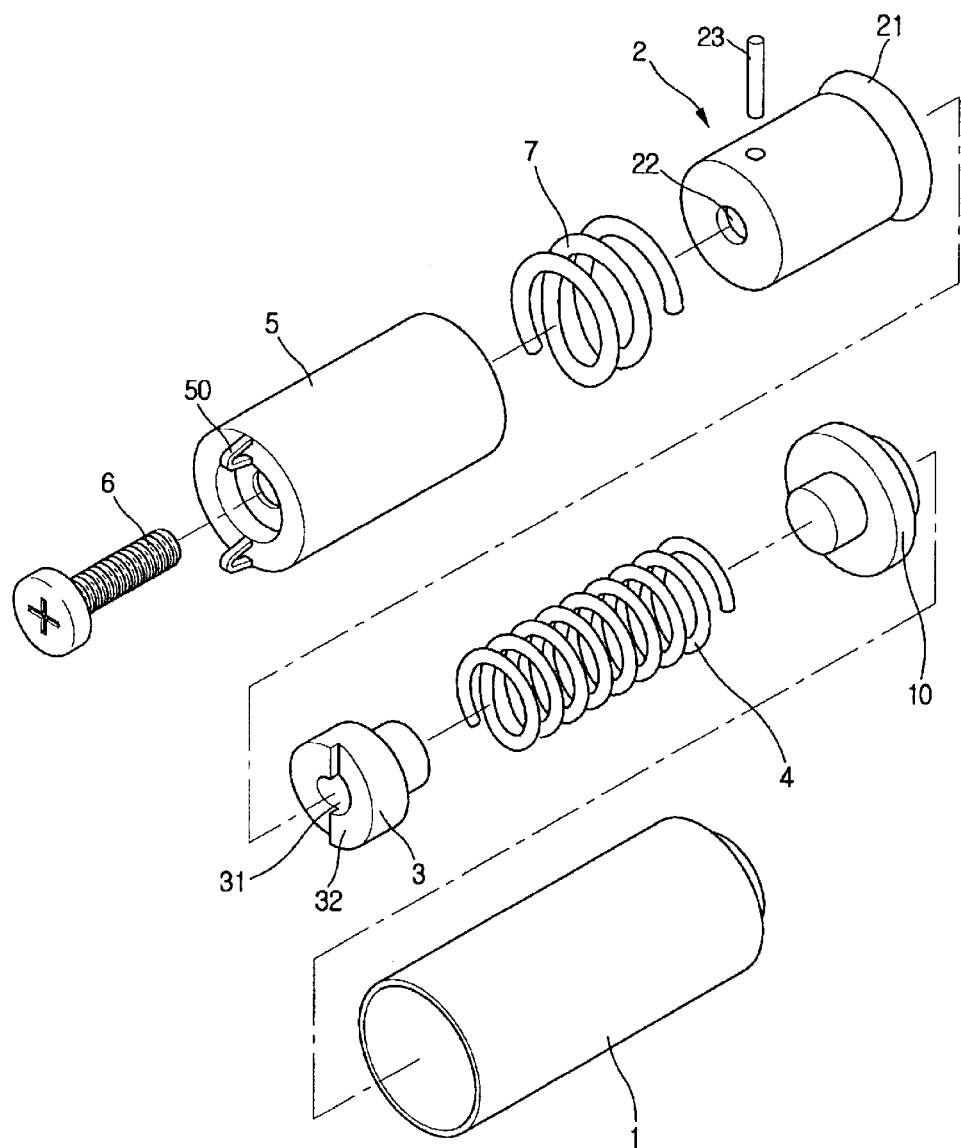
FIG. 1 is an exploded perspective view of a damper hinge in accordance with the present invention.
Figure 2:
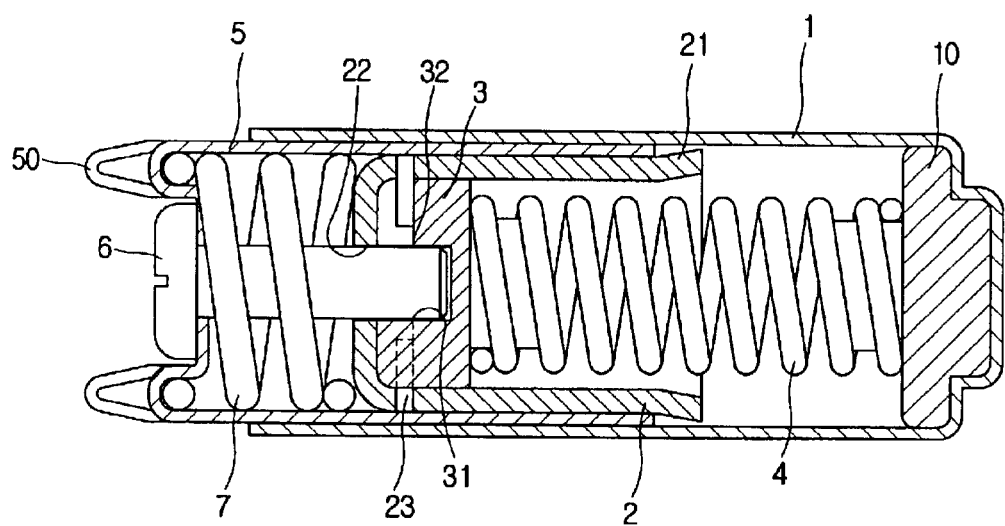
FIG. 2 is a cross-sectional view of the damper hinge in its assembled state in accordance with the present invention.

As shown in FIGS. 1 and 2, an external housing 1 formed to have a hollow cylindrical shape opened at its one end is prepared. A spring supporting cap 2 formed to have a hollow cylindrical shape opened at its one end opposite to the opened end of the external housing 1 is fixed to the external housing 1 by a conventionally known fixing method. A sliding cam 3 is provided within the spring supporting cap 2 so as to move forward and backward by the rotation of the spring supporting cap 2.

A compression/torsion spring 4 is provided within the spring supporting cap 2. An end of the compression/torsion spring 4 is fixed to the sliding cam 3, and the other end of the compression/torsion spring 4 is fixed to the external housing 1. Therefore, a compressive force and a torsional moment are simultaneously supplied to the compression/torsion spring 4 by the rotation and the forward and backward movement of the sliding cam 3. Herein, the other end of the compression/torsion spring 4 is fixed to the external housing 1 by a spring fixture 10. The spring fixture 10 is not rotated by any conventional rotation preventing means such as means for holding or fixing the spring fixture 10 to the external housing 1, thereby serving to fix the compression/torsion spring 4.

An internal housing 5 formed to have a hollow cylindrical shape opened at its one end in the same direction as the opened end of the spring supporting cap 2 is inserted into a gap between the outer surface of the spring supporting cap 2 and the inner surface of the external housing 1 so as to be rotatable and movable. The internal housing 5 is connected and fixed to the sliding cam 3 within the spring supporting cap 2 by an adjusting screw 6 passing through the internal housing 5 and the spring supporting cap 2. For this purpose, a through hole 22 and a locking hole 31 are respectively formed on central areas of the spring supporting cap 2 and the sliding cam 3.

A compression spring 7 is provided in a space between the internal housing 5 and the spring supporting cap 2 so that the internal housing 5 is elastically supported by an elastic force of the compression spring 7. The elastic force of the compression spring 7 is maintained by loosening and fastening the adjusting screw 6. The opened end 21 of the spring supporting cap 2 is flared outwardly in a bell shape, and the flared section 21 of the spring supporting cap 2 serves as a stopper for limiting a range of movement of the internal housing 5.

A cam surface 32 is formed on one side surface of the sliding cam 3, and a cam driving pin 23 sliding along the cam surface 32 is inserted into the spring supporting cap 2, thereby rotating and moving the sliding cam 3. More specifically, the sliding cam 3 is rotated by the rotation of the internal housing 5 connected thereto via the adjusting screw 6. When the sliding cam 3 is rotated, the cam driving pin 23 is slid along the cam surface 32 of the sliding cam 3. Thereby, the outer surface of the sliding cam 3 is slid along the inner surface of the spring supporting cap 2, and thus the sliding cam 3 moves forward and backward within the spring supporting cap 2.

Oil with high viscosity is injected into the sliding surfaces between the outer surface of the sliding cam 3 and the inner surface of the spring supporting cap 2, the outer surface of the spring supporting cap 2 and the inner surface of the internal housing 5, and the outer surface of the internal housing 5 and the inner surface of the external housing 1, thereby providing lubricating and damping functions.

Herein, a non-described reference numeral 50 denotes a fixing loop for fixing the internal housing 5 to a cover of a small-sized portable article.

Hereinafter, with the reference to the accompanying drawings, an operation of the damper hinge of the present invention will be described in detail.

As shown in FIG. 2, the internal housing 5 is fixed to a cover of an article, and the external housing 1 is fixed to a main body of the article. At this time, the cover is opened from the main body of the article.

When the cover is closed into the main body of the article, the internal housing 5 is rotated together with the cover. Thereby, the sliding cam 3 connected to the internal housing 5 by the adjusting screw 6 is rotated within the spring supporting cap, and simultaneously the outer surface of the sliding cam 3 is slid along the inner surface of the spring supporting cap 2 so as move forward within the spring supporting cap 2. Herein, a compressive force and a torsional moment are simultaneously supplied to the compression/torsion spring 4 by the rotation and the forward and backward movement of the sliding cam 3. Hereinafter, the operation of the sliding cam 3 will be described in more detail.

Figure 3A:
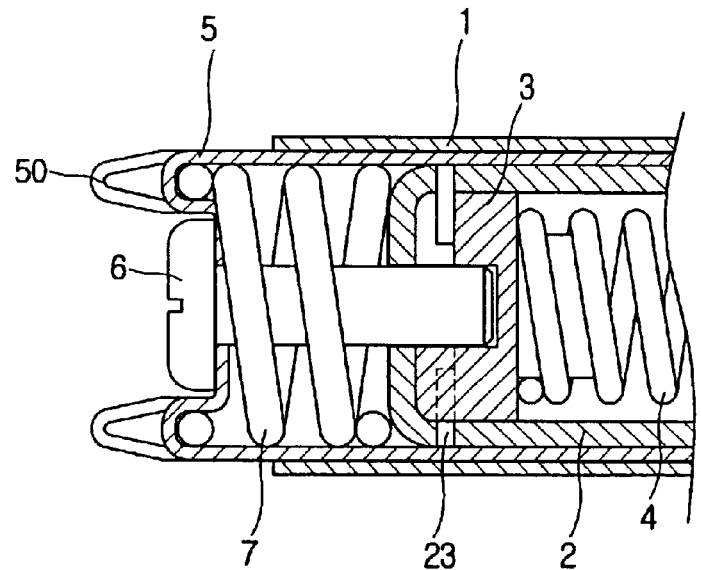
FIGS. 3a and 3b show an operation of the damper hinge in accordance with the present invention, and more specifically.
Figure 3B:
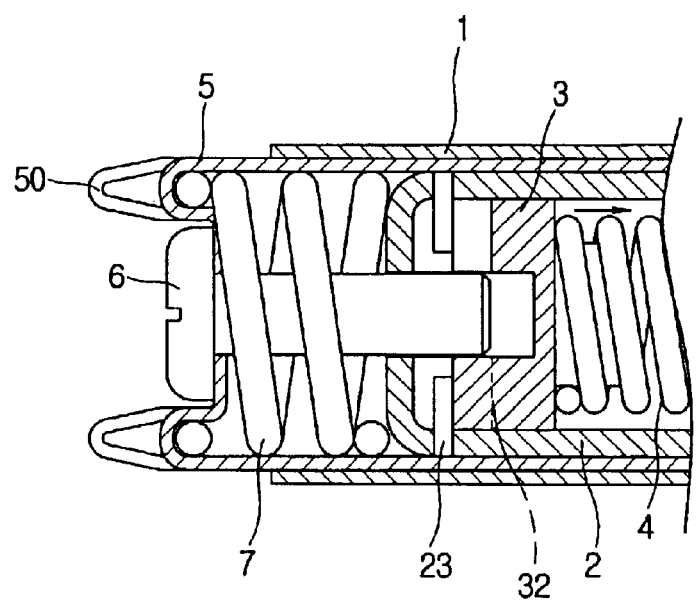

As shown in FIG. 3a, the sliding cam 3 is first rotated by closing the cover into the main body. Then, as shown in FIG. 3b, as the cam driving pin 23 of the spring supporting cap 2 is slid along the cam surface 32 of sliding cam 3, the outer surface of the sliding cam 3 is slid along the inner surface of the spring supporting cap 2 and thus the sliding cam 3 moves forward within the spring supporting cap 2.

As described above, after the cover is closed into the main body, the locking condition between the cover and the main body is maintained by the locking means. When the locking condition is released so as to use the article, the internal housing 5 is rotated so as to return to its original position by the restoring force against the aforementioned compressive force and torsional moment accumulated on the compression/torsion spring 4, thereby smoothly opening the cover from the main body. Herein, the sudden opening of the cover from the main body is prevented by the elastic force of the compression spring 7 for elastically supporting the internal housing 5 so as to gradually dampen the restoring forces. Therefore, the cover can be smoothly opened from the main body, and the opening of the cover from the main body is stopped at the point where the restoring force of the compression spring 7 is identical with the restoring force of the compression/torsion spring 4.

As apparent from the above description, the present invention provides a damper hinge for smoothly opening a cover from a main body in a small-sized portable article, thereby preventing a breakdown and damage of its hinge portion and assuring simplicity in its use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A damper hinge in which a spring supporting cap formed to have a hollow cylindrical shape opened at its one end opposite to an opened end of an external housing is disposed within the external housing, a sliding cam moving forward and backward by its rotation is provided within the spring supporting cap, a compression/torsion spring with one end fixed to the sliding cam and the other end fixed to the external housing is interposed between the spring supporting cap and the external housing, an internal housing is inserted into a gap between an outer surface of the spring supporting cap and an inner surface of the external housing, the sliding cam is connected to the internal housing by an adjusting screw passing through the internal housing and spring supporting cap, and the internal housing is elastically supported by a compression spring installed between the spring supporting cap and the internal housing.

2. The damper housing as set forth in claim 1,
wherein a cam surface is formed on one side surface of the sliding cam and a cam driving pin sliding along the cain surface protrudes from the inner surface of the spring supporting cap so that the sliding cain is rotated together with the rotation of the internal housing so to move forward and backward.

3. The damper hinge as set forth in claim 1,
wherein an outwardly hated section is formed on the opened end of the spring supporting cap so as to limit a range of movement of the internal housing.

* * * * *